United States Patent [19]

Swihart et al.

[11] Patent Number: 4,679,984

[45] Date of Patent: Jul. 14, 1987

[54] ACTUATION SYSTEM FOR VARIABLE NOZZLE TURBINE

[75] Inventors: William R. Swihart, Torrance; Edwin R. Deacon, Rolling Hills Estates, both of Calif.

[73] Assignee: The Garrett Corporation, Los Angeles, Calif.

[21] Appl. No.: 807,916

[22] Filed: Dec. 11, 1985

[51] Int. Cl.⁴ .............................................. F01B 25/02
[52] U.S. Cl. ..................................... 415/163; 417/406
[58] Field of Search ................. 60/602; 415/163, 164, 415/165; 417/406, 407

[56] References Cited

U.S. PATENT DOCUMENTS

| | | |
|---|---|---|
| 2,428,830 | 10/1947 | Birmann . |
| 2,976,013 | 3/1961 | Hunter ............................ 415/164 X |
| 3,033,519 | 5/1962 | Radtke . |
| 3,101,926 | 8/1963 | Weber . |
| 3,112,096 | 11/1963 | Lazo et al. . |
| 3,318,513 | 5/1967 | Johnson . |
| 3,542,484 | 11/1970 | Mason . |
| 3,645,645 | 2/1972 | Gammill et al. . |
| 3,999,883 | 12/1976 | Nordenson . |
| 4,025,227 | 5/1977 | Greenberg et al. . |
| 4,150,915 | 4/1979 | Karstensen . |
| 4,179,247 | 12/1979 | Osborn ............................ 415/163 X |
| 4,353,685 | 10/1982 | Osborn et al. . |
| 4,363,600 | 12/1982 | Thebert . |
| 4,521,155 | 6/1985 | Osborn ............................ 415/190 |

FOREIGN PATENT DOCUMENTS

| | | |
|---|---|---|
| 0030230 | 11/1970 | European Pat. Off. . |
| 0080810 | 6/1983 | European Pat. Off. . |
| 0093462 | 11/1983 | European Pat. Off. . |
| 51-141707 | 11/1976 | Japan . |
| 54-84123 | 7/1979 | Japan . |
| 56-129705 | 10/1981 | Japan . |
| 58-40523 | 3/1983 | Japan . |
| 58-91330 | 5/1983 | Japan . |
| 58-82439 | 6/1983 | Japan . |
| 58-192925 | 11/1983 | Japan . |
| 731822 | 6/1955 | United Kingdom ................ 415/164 |
| 861630 | 2/1961 | United Kingdom . |
| 1473248 | 5/1972 | United Kingdom . |
| 1427659 | 3/1976 | United Kingdom . |
| 715812 | 2/1980 | U.S.S.R. . |

OTHER PUBLICATIONS

"Turbocharging for Better Vehicle Engines", by W. T. VonderNuell-FIG. 13, SAE, 1963, paper 631A.

*Primary Examiner*—Stephen F. Husar
*Attorney, Agent, or Firm*—J. Henry Muetterties; Albert J. Miller

[57] ABSTRACT

A turbocharger having a variable nozzle vane assembly to be used in association with an engine. A plurality of pivotable vanes are mounted between the turbocharger backplate and unison ring on one side and an annular side wall, independent of the turbine housing on the other. Each vane includes a drive pin which pivots the vane in response to rotational movement of the unison ring.

28 Claims, 8 Drawing Figures

ACTUATION SYSTEM FOR VARIABLE NOZZLE TURBINE

BACKGROUND OF THE INVENTION

The present invention relates to turbomachinery and more particular to a variable nozzle vane assembly upstream of the turbine.

In turbomachinery in which the turbine is intended to drive a compressor or the like, it is often desirable to control the flow of motive gas to the turbine to improve its efficiency or operational range. In order to accomplish this, the nozzle passages leading to the turbine wheel may be of variable geometry. These variable geometry nozzle passages can be provided by means of a plurality of vanes which are pivotable so as to alter the throat area of the passages therebetween. It is advantageous to adequately seal the tips of the vanes so as to avoid leakage of exhaust gas around therearound, however, sealing the vane tips against leakage must be accomplished in such a manner as to avoid binding of the vanes within the passageway.

Several different approaches have been taken in an attempt to provide an effective seal at the tips of the turbine nozzle vanes. One approach had been to springload the nozzle ring so that the vane tips are always firmly held against the opposing wall, U.S. Pat. No. 3,112,096. Another approach involves the use of the pressure of the exhaust gas to load a pressure plate located within the outer shroud wall, against the vane tips, see U.S. Pat. No. 3,033,519. A third approach has been to allow exhaust gas pressure to force blades internal to the vane to extend from the vane in order to seal off any leakage around the vane, see U.S. Pat. No. 3,101,926.

SUMMARY OF THE INVENTION

In accordance with the present invention, a plurality of rotatable vanes are mounted within an annular passageway immediately upstream of the turbine wheel to a unison ring. The annular passageway is defined by the unison ring and backplate on one side and an independent side wall on the other. The side wall is located within the turbine housing. Between the side wall and the turbine housing is a seal to prevent exhaust gas leakage around the turbine wheel. Axial spacing between the unison ring and side wall is fixed by spacers thereby preventing binding of the vanes during periods of high temperature operation and the associated thermal expansion and warpage of the turbine housing. In this manner the vanes remain rotatable and avoid binding within the nozzle passageway and are free to pivot in response to engine operating conditions.

In addition, each vane has a vane drive pin associated therewith which connects the vanes to the unison ring such that rotation of the unison ring pivots the vanes. The unison ring includes a slot for each vane drive pin and at least three rollers attached thereto. The rollers are spring loaded so that they can accommodate any radial thermal expansion of the backplate.

BRIEF DESCRIPTION OF THE DRAWINGS

FIG. 3 is a sectional view of the turbine end of the turbocharger which includes the present invention;

FIG. 4 is a partial sectional view of the turbine end of the turbocharger showing the roller and spacer pin;

FIG. 5 is a partial sectional view of the turbine end of the turbocharger showing the bell crank;

FIG. 9 is a partial plan view of the unison ring showing an alternate slot configuration.

DETAILED DESCRIPTION OF THE INVENTION

Figure 1:
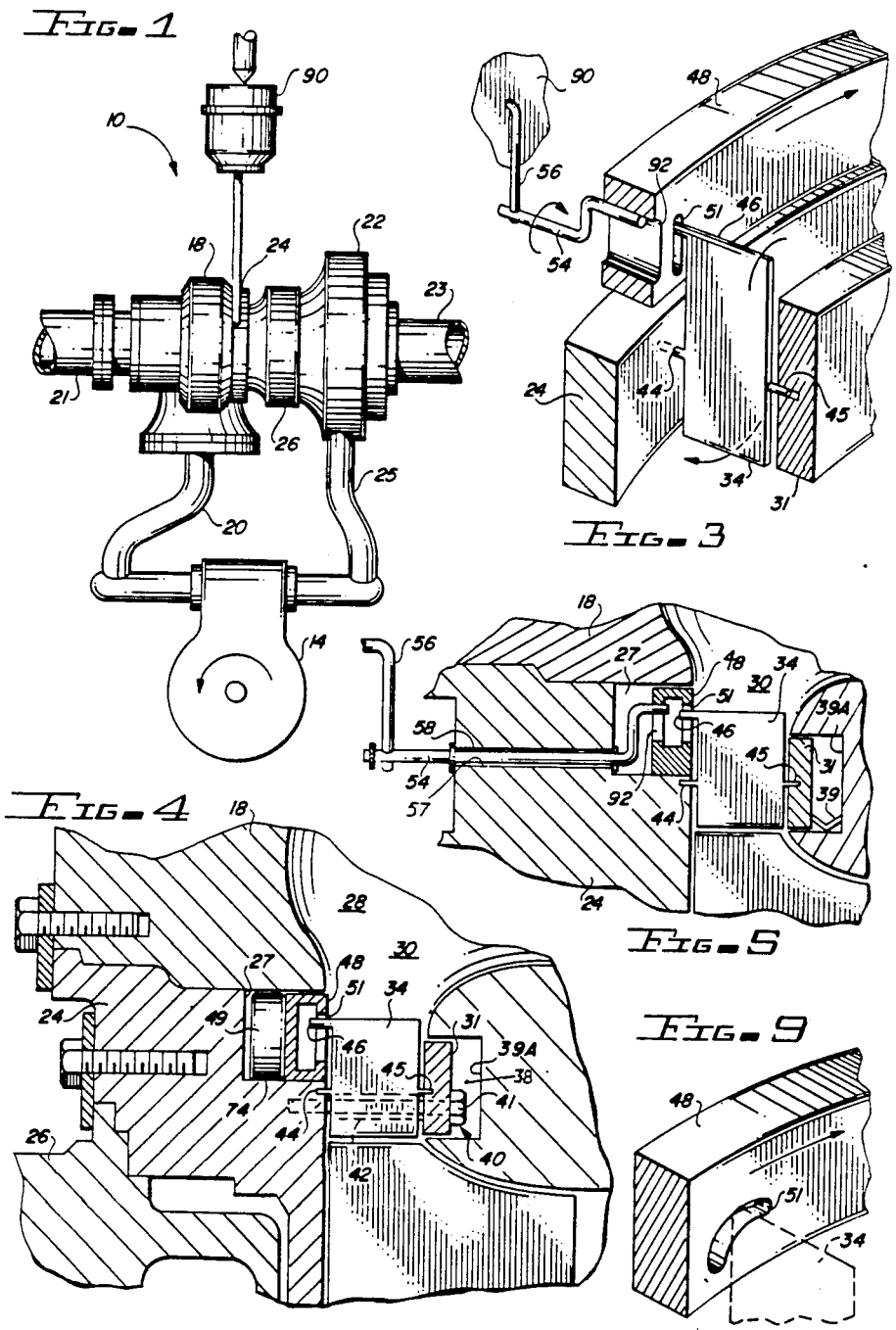
FIG. 1 is a diagrammatic view illustrating a turbocharged engine system.
Figure 2:
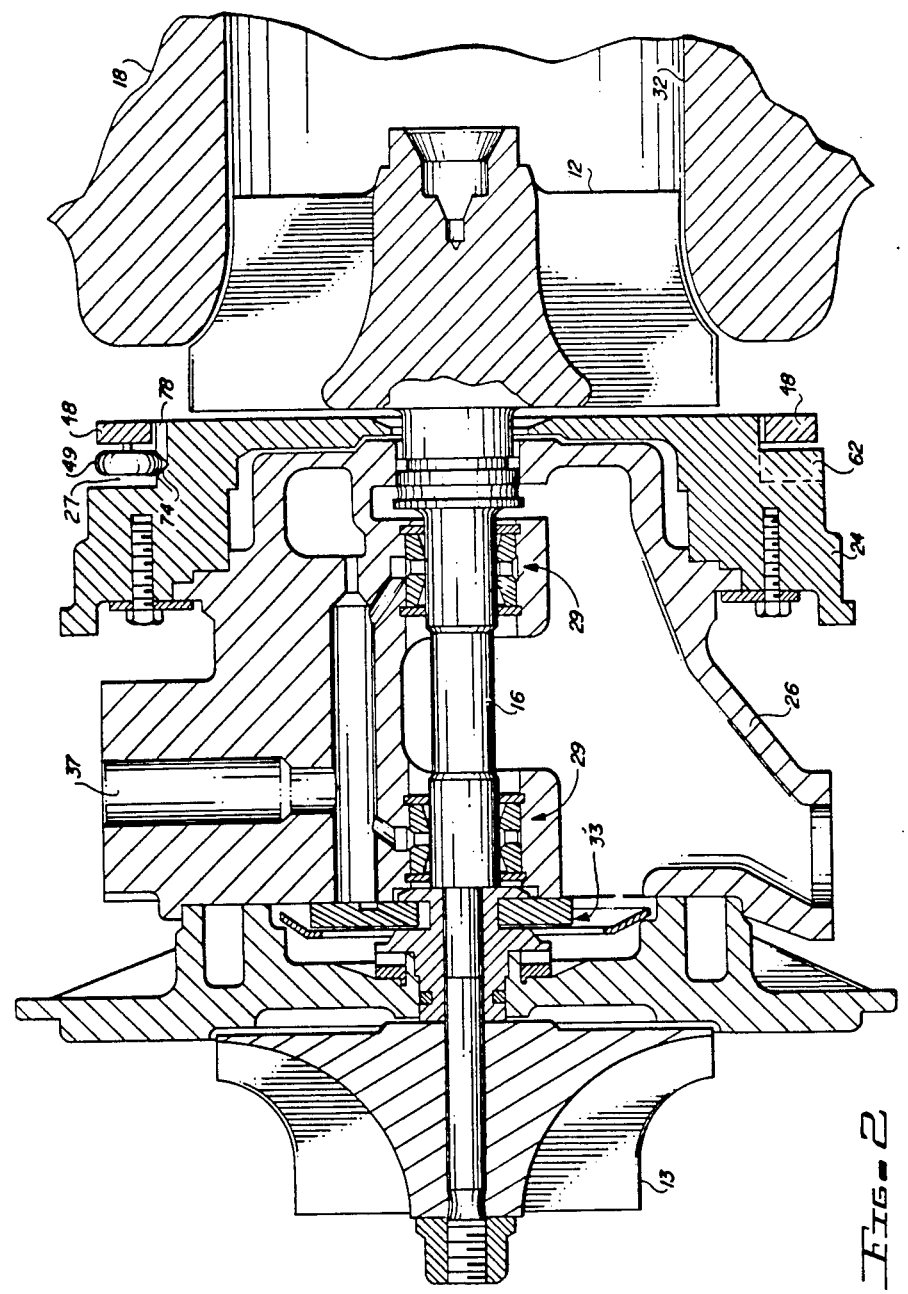
FIG. 2 is a sectional view of the internal components of an exhaust gas turbocharger.

An engine system as shown in the FIGS. 1 and 2 includes turbomachinery in the form of a turbocharger 10 generally comprising a turbine wheel 12 and a compressor impeller 13 mounted on opposite ends of a common shaft 16. The turbine wheel 12 is disposed within a turbine housing 18 which includes an inlet 20 for receiving exhaust gas from an engine 14 and an outlet 21 for discharging the exhaust gas. The turbine housing 18 guides the engine exhaust gas into communication with and expansion through the turbine wheel 12 for rotatably driving the turbine wheel. Such driving of the turbine wheel simultaneously and rotatably drives the compressor impeller 13 which is carried within a compressor housing 22. The compressor housing 22, including an inlet 23 and outlet 25 and the compressor impeller 13 cooperate to draw in and compress ambient air for supply to the intake of the engine 14.

The turbine housing 18 is mounted to a turbine backplate 24 which in turn is mounted to center housing 26. The compressor housing 22 is mounted on the other side of the center housing 26. The center housing 26 includes a bearing means 29 for rotatably receiving and supporting the shaft 16. A thrust bearing assembly 33 is carried about the shaft adjacent the compressor housing for preventing axial excursions of the shaft 16. Backplate 24 forms a heat shield at the turbine end in order to insulate the center housing 26 from the harmful effects of the exhaust gas.

Lubricant such as engine oil or the like is supplied via the center housing 26 to the journal bearing means 29 and to the thrust bearing assembly 33. A lubricant inlet port 37 is formed in the center housing 26 and is adapted for connection to a suitable source of lubricant such as filtered engine oil. The port communicates with a network of internal supply passages which are formed in the center housing 26 to direct the lubricant to the appropriate bearings. The lubricant circulated to the bearings is collected in a suitable sump or drain for passage to appropriate filtering, cooling, and recirculation equipment, all in a well-known manner.

The turbine housing 18 forms a generally scroll-shaped volute 28 which accepts the exhaust gas from the engine 14 and directs it onto the turbine wheel blades through an annular passage 30 in a radially inward manner. Thereafter the exhaust gas flows axially through the turbine shroud 32 and exits the turbocharger through outlet 21 either into a suitable pollution-control device or the atmosphere. Placed within the annular passageway 30 are a plurality of pivotable vanes 34 which operate to vary the geometry of the annular passage 30 to control the angle at which the exhaust gas strikes the blades of the turbine wheel 12.

This in turn controls the amount of energy imparted to the compressor wheel and ultimately the amount of air supplied to the engine.

The variable geometry turbine nozzle of the present invention is located between the backplate 24 and turbine housing end of turbocharger 10. In their assembled state, the backplate 24 and the turbine housing 18 form a cavity 27 between the two within which is located the hardware used in conjunction with the variable geometry turbine nozzle as will be described below. The exhaust gas present within volute 28 flows through the annular passageway 30 formed by an annular vane side wall 31 located in an annular slot 38 in turbine housing 18 and an annular unison ring 48. Between side wall 31 and wall 39A and within annular slot 38 is located an annular seal 39 (FIG. 5) which prevents exhaust gas leakage around the vanes 34. Located circumferentially around and within the annular passageway 30 are the plurality of vanes 34 which are free to rotate therein. Annular side wall 31 is independent of turbine housing 18.

The vanes 34 are arranged around the unison ring 48 and positioned between the side wall 31 on one side of the annular passageway and the unison ring 48 and backplate 24 on their other side. Sidewall 31 and backplate 24 serve to define the axial width of the annular passageway 30. Backplate 24 provides a diameter to radially locate the unison ring 48. Sidewall 31 covers the entire radial length of the vanes, while the backplate 24 only covers the lower half of the vanes and the unison ring covers the upper half. Side wall 31 is free to move axially in response to the thermal expansion of the components.

The annular passage width is maintained by three or more spaced columns 40 (FIG. 4) between the backplate 24 and the side wall 31. Columns 40 comprise a bolt 41 and a spacer 42; bolts pass through the side wall 31 and are threaded into tapped bores in the backplate 24. This minimum axial clearance is therefore maintained during all periods of operation and thereby prevents binding of the vanes.

Each vane 34 include three pins 44, 45 and 46 all extending parallel to the turbocharger shaft axis with two of the pins, 44 and 45, being co-linear. The co-linear pins 44 and 45 are located generally at the mid-span of the vane on opposite axially sides thereof. Pins 44 and 45 serve as the vane pivot point and extend into bores formed in the side wall 31 and backplate 24 respectively. The third pin 46 is located near the vane's leading edge (the radially outer edge) on the side of the unison ring 48. Pin 46 serves as the drive pin for rotation of the vanes. The pin extends into a slot 51 in the unison ring 48. Rotation of the unison ring 48 about the turbocharger shaft axis pivots the vanes 34 about its pivot point (pins 44 and 45) through the sliding contact between the unison ring slot side wall and the vane drive pin 46.

Unison ring 48 is an annular ring with a plurality of slots 51 on its inner radial surface. Each slot 51 receives a vane drive pin 46 as described above. The shape of the vane drive pins must be such as to maintain basically a rolling action wherein slots 51 to avoid binding within unison ring 48 as it rotates. Attached to one side of the unison ring 48 are at least three generally, equally spaced rollers 49. These rollers 49 provide the ease of rotation of the unison ring 48 relative to the backplate 24.

Backplate 24 includes a recessed portion which together with the turbine housing defines cavity 27. The recessed portion defines a track 74 formed in the inner surface of the recess portion such that the track is a constant radial distance from shaft axis of rotation. Rolling contact exists between the rollers and the track 74. The rollers 49 are attached to the unison ring 48 by bolts or rivets 60 or the like. Axial location of the unison ring is accomplished by the method described below.

Figure 6:
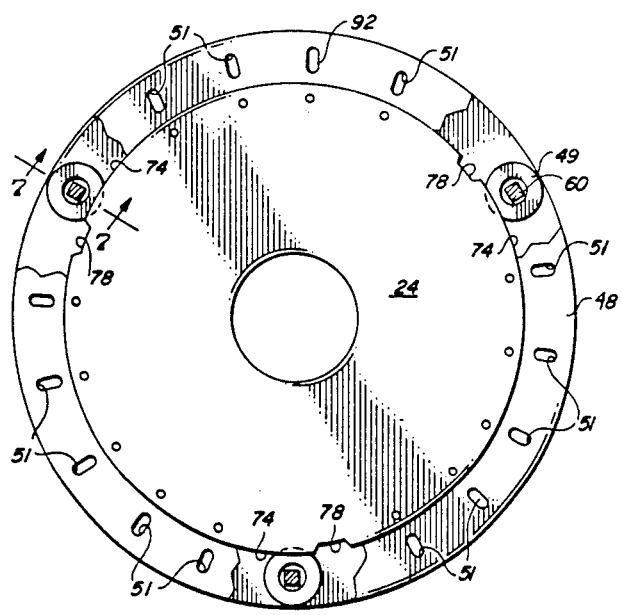
FIG. 6 is a plan view of the unison ring and backplate.

FIG. 6 is a plan view of the unison ring 38 and the backplate 24 with cutouts showing rollers 49. When using a V-shaped track as shown in FIG. 2 assembly of the unison ring 48 to the backplate 24 is slightly more difficult. Assembly is accomplished by having cut-out segments 78 in the backplate 24 corresponding in number and position of the rollers 49. The rollers 49 are aligned with the cut-out segments 78 and slid axially toward the backplate until the rollers are in the track 74. The unison ring is then rotated until the rollers move away from the cut-out segments, in FIG. 7, the rollers have been rotated clockwise. Thus the rollers are free to rotate but can not move axially. FIG. 2 also shows raised segments 62 in backplate 24 which limit the axial travel of the unison ring 48. These sections are located intermittent of the rollers and prevent the unison ring 38 from becoming skewed with respect to backplate 24.

Figure 7:
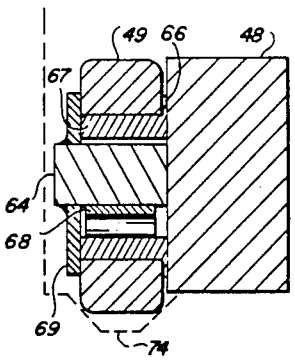
FIG. 7 is a sectional view of the roller assembly taken along line 7—7 of FIG. 6.
Figure 8:
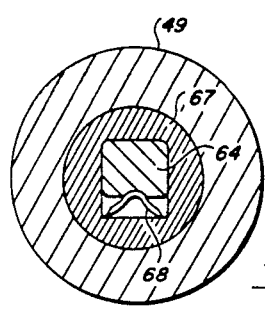
FIG. 8 is a partial cross-sectional view of the means of attaching the rollers to the unison ring.

Furthermore, the rollers 49 can be spring loaded as shown in FIGS. 7 and 8. Axle 64 is attached to unison ring 48 by a conventional means. The axle 64 includes a portion 66 having an increased diameter in order to space the unison ring from the freely rotatably roller. Instead of its normal circular shape the axle has been squared at its end and a circular hub 67 having a rectangular bore therethrough is slid onto the axle. A leaf spring 68 is positioned between the hub and the bottom of the axle. Roller 49 is then slid over the hub such that it is rotatable thereabout. A washer 69 having an outside diameter greater than the hub is secured to the end of the axle to secure the spring loaded roller between the washer and the axle portion having an increased diameter. The feature takes into consideration the radial expansion of the backplate during use and prevents the binding of the unison ring and therefore binding of the vanes.

FIG. 9 discloses an alternative feature of the present invention. The shape of vane slots 51 in unison ring can be altered to provide a variable rate of opening and closing the vanes.

In order to rotate the unison ring 48 between its two extreme positions which correspond to the limits of the geometry of the annular passageway 30, a lever arm system is used as best seen in FIGS. 3 and 5. The end of a first linkage member 54 fits within a coresponding bore 92 within the unison ring 48 in order to transmit any movement in the lever arm to the unison ring 48. The linkage member 54 is rigidly connected at its other end to a rod member 56. The first linkage member 54 projects through a bore 57 in the backplate 24 to a point outside the turbocharger assembly. Bushing 58 is used in association with first linkage member 54. The rod 56 is rigidly connected at its other end to an actuator 90, shown in FIG. 1. The actuator shown is a vacuum boost type which is well known in the art. Furthermore, it is envisioned that other actuator means can be used to control the movement of the vanes.

During operation, movement of the rod 56 is translated into movement of the unison ring via first linkage member 54. In turn, vane drive pins 46 roll against the side wall of slots 51 to pivot vanes 34. Thus there is a change in the geometry of the plurality of passageways formed between adjacent vanes.

The variable nozzle turbocharger actuation system of the present invention is assembled by placing the unison ring/roller assembly together with the backplate 24. If the track 74 is V-shaped, then the rollers 49 and the cut-out segments 78 need to be aligned before the rollers can be slid axially onto the backplate. Thereafter, the unison is rotated clockwise as viewed in FIG. 6 in order to index the rollers within the track 74. The plurality of vanes 34 are located between the unison ring 48 and the backplate 24 by placing the drive pin 46 within the slot 51 of the unison ring and vane pin 44 within bore in the backplate. The annular sidewall 31 is then bolted at a desired spacing to the backplate 24. Backplate 24 and turbine housing 18 are thereafter secured to center housing 26.

Various modifications to the depicted and described apparatus will be apparent to those skilled in the art. Accordingly, the foregoing detailed description of the preferred embodiment of the invention should be considered exemplary in nature, and not as limiting to the scope and spirit of the invention as set forth in the appended claims.

Having described the invention with sufficient clarity that those skilled in the art may practice it, we claim:

1. A turbocharger, for use in association with an engine, comprising:
    an exhaust gas driven turbine rotatably mounted to a shaft having a compressor impeller thereon;
    a compressor housing enclosing said compressor impeller;
    a center housing including bearing means for rotatably supporting the shaft;
    a turbine housing forming a volute therein for directing exhaust gas from said engine to said shaft;
    a backplate mounted between said center housing and said turbine housing and defining an annular cavity therearound;
    an annular unison ring positioned within said annular cavity of said backplate;
    a turbine side wall, independent of said turbine housing, said side wall defining one side of an annular passage, said unison ring and backplate defining the other side;
    a plurality of vanes pivotably mounted between said backplate and said turbine side wall;
    means for pivoting said plurality of vanes; and
    at least three spacers between said backplate and said turbine side wall.

2. The turbocharger according to claim 1 wherein said turbine housing has an annular slot therein concentric to the axis of shaft rotation, said side wall being located within said slot.

3. The turbocharger according to claim 2 further including a flexible seal between said turbine housing and said side wall.

4. The turbocharger according to claim 1 wherein said spacers have an axial length greater than said vanes.

5. The turbocharger according to claim 2 wherein said unison ring includes at least three rollers attached thereto.

6. The turbocharger according to claim 5 wherein said means for pivoting comprises a drive pin associated with each vane and a plurality of slots in said unison ring for accepting said drive pins.

7. The turbocharger of claim 6 wherein said backplate defines a track means for guiding said rollers.

8. The turbocharger according to claim 7 wherein said track means is a flat surface radially about the turbocharger shaft located on said backplate.

9. The turbocharger of claim 8 wherein said track means includes a V-shaped coaxial groove therein.

10. The turbocharger of claim 9 wherein said backplate further includes a cut-out segment for each of said rollers extending to the same radial depth as said groove.

11. A variable nozzle turbocharger including an exhaust gas driven turbine rotatably mounted to a shaft having a compressor impeller thereon, a compressor housing enclosing said compressor impeller, a center housing including bearing means for rotatably supporting the shaft, a turbine housing forming a volute therein for directing the exhaust gas from an engine through an annular passage to said turbine; a plurality of vanes pivotably mounted within said annular passage, and an assembly for pivoting said plurality of vanes comprising:
    a backplate member mounted between said center housing and turbine housing and defining an annular cavity therein and a track radially about the turbocharger shaft;
    a unison ring including a plurality of slots and at least three rollers attached to said unison ring, said rollers positioned on said track;
    a vane driven pin associated with each vane, each vane drive pin extending into one of said slots in said unison ring;
    means for rotating said unison ring; and
    cut-out segments spaced about the track, said cut-out segments being angularly spaced and aligned with said rollers.

12. The assembly of claim 11 further including spring means associated with each roller for absorbing any radial thermal expansion of said backplate.

13. The assembly according to claim 12 wherein said means comprises:
    a bushing around the end of the axle within said roller;
    an axle attached to the unison ring;
    a leaf spring under the axle and between the axle and bushing; and
    means for rotatably securing said roller to said axle.

14. In a turbocharger, a turbine backplate comprising:
    a generally circular body having a central bore for acceptance of a turbocharger shaft;
    a recess portion defining at least three track sections; each track section being an equal radial distance from and coaxial to said central bore; and
    raised segmented sections between each of said track sections.

15. The backplate according to claim 14 further including a groove in said track section.

16. The backplate according to claim 15 further including a cut out segment in each of said track sections extending to the same radial depth as said groove.

17. A variable nozzle turbocharger comprising:
    an exhaust gas driven turbine rotatably mounted to a shaft having a compressor impeller thereon;
    a compressor housing enclosing said compressor impeller;
    a center housing including bearing means for rotatably supporting the shaft;

a turbine housing forming a volute therein for directing exhaust gas from an engine through an annular passage to said turbine;

a backplate member mounted between said center housing and said turbine housing and defining a cavity therein;

an annular side wall located within an annular slot in said turbine housing;

a plurality of vanes pivotably mounted between said side wall and said backplate member in said annular passage;

means for pivoting said plurality of vanes, said means cooperating with said backplate on one side and the side wall on the other to define the annular passage; and at least three bolts including a spacer securing said side wall to said backplate at the desired axial distance.

18. The turbocharger of claim 17 wherein said annular side wall is independent of said turbine housing.

19. The turbocharger of claim 18 including an annular seal between said side wall and said turbine housing.

20. The turbocharger of claim 17 wherein said means for pivoting comprises:

a drive pin integral with each vane;

an annular unison ring including a plurality of slots in one side thereof for accepting said drive pins; and means for rotating said unison ring with respect to said backplate.

21. The turbocharger of claim 17 wherein said backplate comprises:

a generally circular body having a central bore for acceptance of a turbocharger shaft;

a recess portion defining at least three track sections, each track section being coaxial to said central bore; and raised segmented sections between each of said track sections.

22. The turbocharger of claim 21 wherein said backplate further includes a coaxial groove in said track section.

23. The turbocharger of claim 22 further including a cut-out segment in each of said track sections extending to the same radial depth as said groove.

24. A method of assembling a turbocharger comprising the steps of:

securing a turbine wheel to one end of a shaft;

rotatably supporting said shaft in a center housing;

securing a compressor impeller on the other end of said shaft;

mounting a compressor housing onto said center housing to enclose said compressor impeller;

mounting a backplate to said center housing at the turbine end;

rotatably locating a unison ring to a backplate to form one side of an annular passageway;

locating an annular side wall to form the other side of said annular passageway;

pivotally locating a plurality of vanes within said annular passageway and between said backplate and annular side wall; and securing a turbine housing defining a volute therein for directing exhaust gas into momentum exchange relationship with said turbine wheel to said backplate.

25. The method of claim 24 wherein said step of pivotably locating the plurality of vanes includes spacing the backplate and annular side wall a constant distance apart from one another.

26. The method of claim 24 wherein further including the step of sealing the annular side wall to prevent exhaust gas flow behind the annular side wall around said annular passageway.

27. The method of claim 24 wherein the step of rotatably locating the unison ring includes the steps of:

securing at least two rollers to said unison ring;

indexing said rollers with cut-out segments formed in the backplate; and rotating said rollers in a track formed in the backplate away from said cut-out segments.

28. The method of claim 27 further including the step of spring-loading the rollers in said track.

* * * * *